Patented July 21, 1936

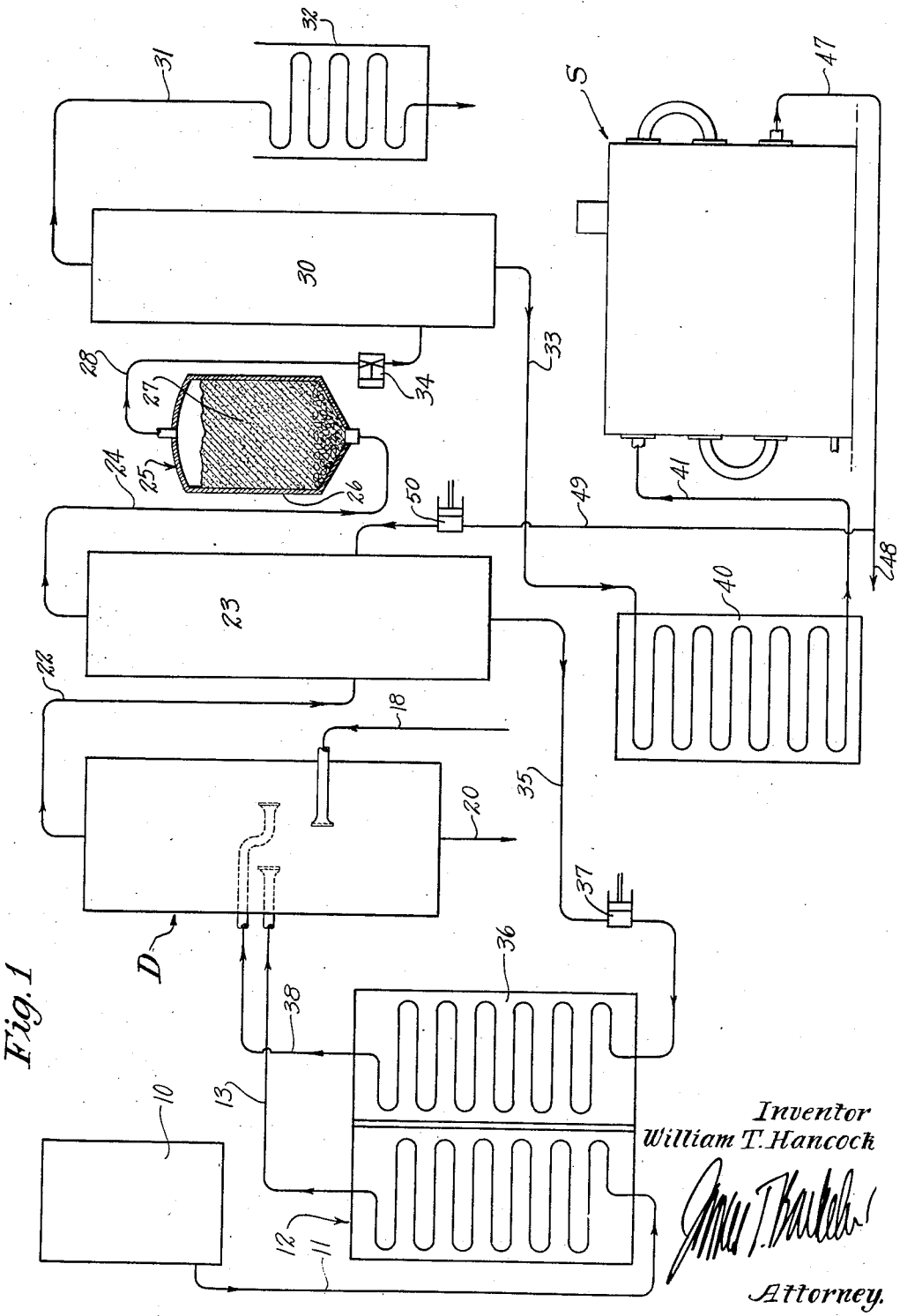

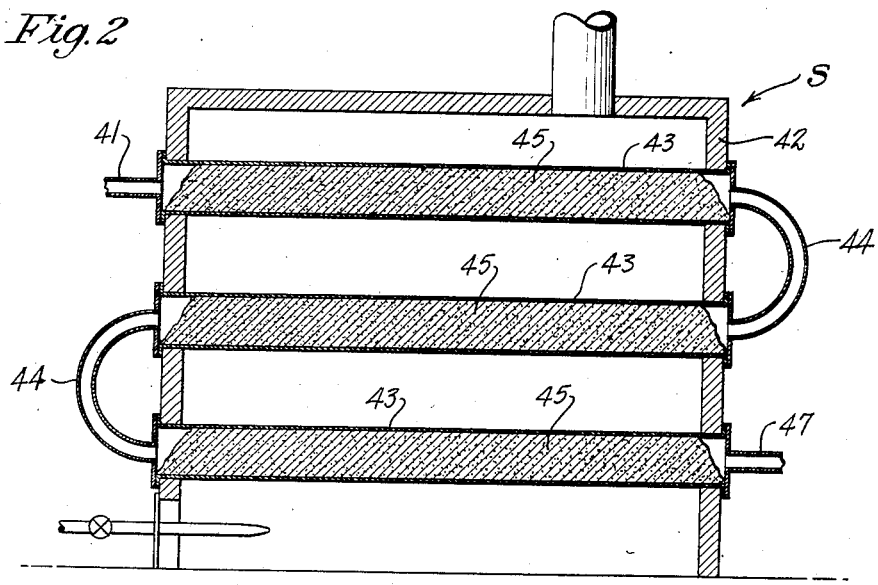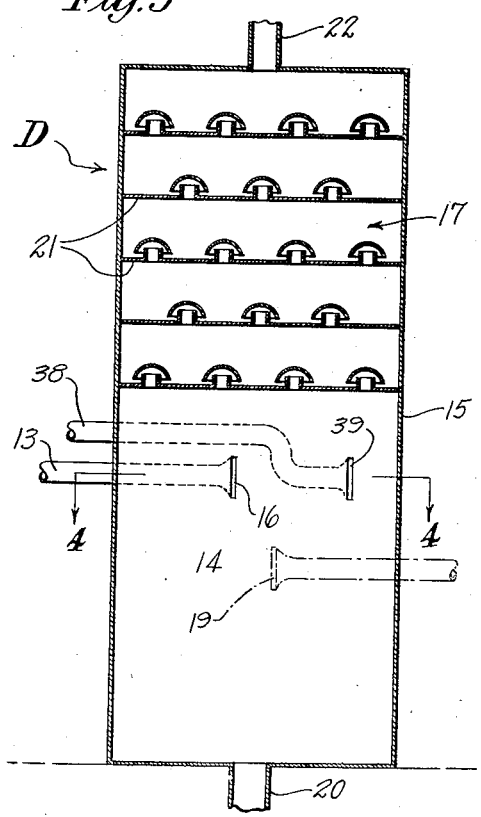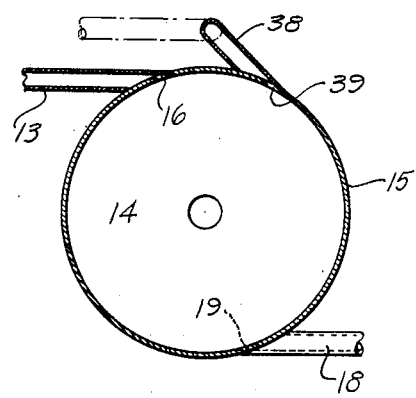

2,048,546

UNITED STATES PATENT OFFICE 2,048,546

PETROLEUM REFINING SYSTEM

William T. Hancock, Long Beach, Calif.

Application June 29, 1932, Serial No. 619,901

4 Claims. (Cl. 196—60)

This invention has reference to petroleum refining systems, and has for its principal objects to provide for the maximum recovery of gasoline from the charging stock, and for the production of gasoline having non-detonating properties and other properties rendering it superior as motor fuel.

In one of its aspects, the invention is characterized by the provision of a distillation system in which the charging stock is subjected to two stage heating and vaporization, the first heating stage being at temperatures below cracking temperature of the oil but sufficient to vaporize the entire gasoline content of the oil, and the second at cracking temperatures which convert heavier fractions not vaporized in the first heating stage, to gasoline. The vapors from both heating stages are combined and subjected to fractionation for the recovery of gasoline. In furtherance of maximum recovery of gasoline from the charging stock, I also preferably subject the condensate from the last mentioned fractionating operation to cracking, for the conversion of such heavier than gasoline fractions as kerosene and gas oil, to gasoline.

The product gasoline is rendered non-detonating principally by the treatment of the oil in certain stages of the process as later described, with adsorptive clay such as fuller's earth, or other well known substances possessing similar adsorbent properties. In accordance with the invention, the oil vapors at one stage in the system are subjected to cracking in the presence of the adsorbent material, this method of cracking being, to my knowledge, a wide departure from other such methods and also from other systems heretofore devised involving vapor treatment by adsorptive clays.

The above features of the invention, as well as further details and the various objects thereof, will be understood to best advantage without necessity for further preliminary discussion, from the following description. I have shown in the drawings and in diagrammatic form, certain apparatus suitable for carrying out the process, but with the understanding that the process is not necessarily limited to the use of any particular type of equipment, and that those familiar with the art will recognize the adaptability of various known arrangements and constructions of apparatus for carrying out the process.

Reference is had throughout the following description to the accompanying drawings, in which:

Fig. 1 is a general view illustrating a typical petroleum refining system embodying the invention, the apparatus being shown diagrammatically and in flow sheet form;

Fig. 2 is an enlarged sectional view of the clay tube cracking still indicated at S in Fig. 1;

Fig. 3 is an enlarged sectional view of the separator shown at D in Fig. 1; and

Fig. 4 is a section on line 4—4 of Fig. 3.

Referring first to Fig. 1, the charging stock or oil to be subjected to distillation and cracking, may be derived from any suitable source, as supply tank 10, and may be of any suitable character or constituency for distillation under the conditions hereinafter described. For example, the system has been found to operate satisfactorily and efficiently on charging stock consisting of residuum from straight run distillation, that is, the residual content of the crude after the gasoline or lighter fractions have been removed in topping stills. From supply source 10, the oil is taken by line 11 to pipe still 12, in passing through the coils of which the oil is subjected to a first stage heating to an outlet temperature between substantially 500° F., to 700° F., and preferably, where charging stock consisting of straight run residuum is being used, to a temperature of about 600° F.

In this first heating stage, the oil is subjected to partial vaporization, in accordance with its volatile content, and is then discharged through line 13 into a separating chamber 14, see Fig. 3, within the lower interior of shell 15. As illustrated most clearly in Fig. 4, line 13 connects tangentially with shell 15 at an upper point in separating chamber 14, line 13 communicating with the interior of the shell by way of a comparatively narrow and vertically extending slot 16. The vapor and residuum mixture is thus discharged tangentially into and in a circular swirling path within the separating chamber, the heavy unvaporized residual bodies being thrown to the outside of the swirling mixture and caused to drain down along the wall of the shell. The vapors are released toward the center of the chamber to pass upwardly through the bubble cap section 17 of the separator, as will be presently described.

An oil, such as fuel oil, derived from a suitable extraneous source, is also discharged into the separating chamber in such manner as to follow the circular path being taken by the residual oil from line 13. A two-fold purpose is accomplished by injecting fuel oil into the separating chamber. First, the fuel oil, in being intimately mixed with the residuum and in being caused to follow a corresponding path, effectively dilutes the residuum and picks up any solid carbon or tarry bodies that may be present therein, to prevent the deposit and accumulation of such bodies on the wall and in the bottom of shell 15. This diluting and carbon removing effect accomplished by the injection of a carbon free oil into the separating chamber, applies also to the cracking still residuum injected into the separating chamber, as later described. The fuel oil also serves to dilute the heavy residuums injected into the separating chamber, to an extent such as to render them suitable for use as fuel oil.

The fuel oil is injected into the separating chamber from tangential line 18 through a slotted orifice 19 in the wall of the shell, the injected fuel oil following a circular path in conformity with the wall of the shell and in the same direction as the path followed by the injected residual oils. The residuum and fuel oil mixture is drained from the separating chamber through line 20 and thence to a fuel oil tank, not shown. The method of injecting and commingling the oil streams in the separating chamber is more specifically dealt with and claimed in my copending application on Petroleum refining system (Case V) Ser. No. 733,596, filed July 3, 1934, now U. S. Letters Patent No. 2,035,547, dated March 31, 1936.

I preferably provide within the upper interior of the separator shell, a series of bubble cap trays 21 of conventional design well known to those familiar with the art. In passing upwardly through the bubble cap trays, the vapors released in the separating chamber are stripped of whatever liquid or solid particles they may contain, so that when discharged through line 22, the vapors are free from all contaminating bodies of a heavy nature. In a typical instance, the vapors taken from the separator may be said to consist mainly of fractions including, and lighter than gas oil, although the vapor constituency may vary in accordance with such factors as the nature of the charging stock, the temperature at which the first heating stage is conducted, and the extent of condensation in the separator.

The vapors pass from the separator through line 22 to a fractionating column 23, which may be of any suitable design, for example of the multiple bubble cap plate type. Within the fractionating column, the vapors become depleted of their heavier constituents to the extent that the vapors passing through outlet line 24 consist mainly of gasoline, kerosene, and perhaps some substantial part of the gas oil fraction. The clay tower may be stated briefly to comprise a vertically extending shell 26 containing a body of adsorbent clay 27, such as fuller's earth or the like, the vapors being passed upwardly through the clay to be discharged through line 28. While numerous advantages are gained with respect to the properties of the finished gasoline as a result of passing the vapors through a body of adsorbent clay, such as a material reduction in the amount of acid usually required for treatment, and in giving to the product a substantially water-like color without further treatment, the principal object of so treating the vapors is to increase the non-detonating properties of the final product, and to increase the so called "octane" number of the gasoline.

From the clay tower, the vapors are taken through line 28 to fractionating column 30, wherein all constituents heavier than gasoline are removed. The gasoline vapors are thence passed through line 31 to final condenser 32, and the condensed heavy constituents are led off from the fractionating column through line 33. Preferably the system up to fractionating column 30 is maintained under a substantial pressure, and for this purpose a pressure control valve 34 is placed in line 28, the valve being set to maintain a back pressure within the heating units, separator D, fractionating column 23 and the clay tower 25, in the neighborhood of 100 pounds per square inch gage. The residuum or condensate from fractionating column 23 is conducted through line 35 to a second stage heating tube still 36, the oil being forced through under pressure by pump 37, and the oil being heated in passing through the still to a temperature between 800° F. and 1100° F. Where straight run residuum is being used as charging stock, the oil outlet temperature in the still 36 may be in the neighborhood of 900° F. Under the temperatures and pressures prevailing in the second stage heater 36, the oil is subjected to cracking to convert a large proportion of the residuum being fed to the cracking still, and consisting of kerosene, gas oil and heavier fractions, to fractions coming within the gasoline range.

The mixture of vapors and unvaporized residuum is discharged from the cracking still through line 38 into the separating and vapor mixing chamber 14, line 38 connecting with the separator shell at a tangent, and the mixture of cracked vapors and residuum being injected into the chamber through a slotted orifice 39, in a manner similar to the injection of the oil and vapor mixture from the first stage heater, as previously described. The cracked vapors combine, in the separating chamber, with those produced from the first heating stage. The second stage is combined with the first stage residuum and with the oil introduced through line 18, to be discharged by way of line 20 for use as fuel oil, or for any other desired purpose.

In order that a maximum production of gasoline may be had from the available constituents of the charging stock capable of conversion to gasoline, the bottoms from fractionating column 30 also are preferably subjected to cracking and conversion to gasoline. Although this final cracking operation may be carried out according to any desired process, within the broad aspects of the invention, I preferably adopt, for this purpose, a cracking system of the character hereinafter described, and which I believe to be an inventive departure from cracking systems heretofore developed. This cracking system may be characterized as providing for the cracking of the vaporized oil in the presence of an adsorptive clay. It has been common practice heretofore to treat oil vapors with adsorbent clay for the purpose of removing undesirable heavy constituents, as by the formation of heavy, dark colored polymers induced by the adsorptive properties of the clay, but to my knowledge it has not been to subject the vapors to cracking in the presence of adsorptive clays. Heretofore, the vapors have been passed through clay at substantially the vaporizing temperature of the oil, and perhaps in certain instances at temperatures slightly above, but in no instance have the vapors been contacted with the clay at high cracking temperatures, say in the neighborhood of 1000° F.

The bottoms from fractionating column 30 pass through line 33 to pipe still 40 in which the oil is completely vaporized by heating to a temperature in the neighborhood of 500° F., or higher, in accordance with the character of the heavy constituents in the oil. At a temperature of about 500° F., of course, the vapors will not be subjected to substantial cracking. The vapors thence are taken by way of line 41 to the clay tube cracking still S. As shown in Fig. 2, still S comprises a brick work 42 within which a series of horizontally extending tubes 43 are arranged, the ends of the tubes being connected by return bends 44. Any suitable number of these tubes 43 may be used to afford the necessary length of travel of the vapors at cracking temperatures in contact with the clay, three tubes being shown herein as typical only. Tubes 43 are filled with a suitable adsorbent clay 45, such as fuller's earth or the like, such clay, by virtue of its adsorbent nature, having the property, when in the presence of oil vapors at cracking temperatures, of rendering the gasoline product resulting from the cracking operation, highly non-detonating and capable of being brought within motor fuel specification with a slight acid treatment. Cracking the vapors in the presence of adsorbent clay results also in the rendering of gasoline product superior in color. In fact, it is unnecessary in the cracking of many oils by this method, for the gasoline product to be given final acid or clay treatment to meet the usual color requirements.

In passing through the clay containing tubes of the cracking still S, the vapors are heated to temperatures within substantially the range of 800° F. to 1200° F., and preferably at about atmospheric pressure, although some substantial pressure may be maintained on the vapors if desired. The cracked vapors pass from the still S through line 47 and may be taken by way of line 48 to suitable fractionating apparatus, not shown, for the recovery of gasoline, or the cracked vapors may be returned through line 49 to fractionating tower 23 to be combined with the previously combined vapors from the first and second heating stages, being passed into tower 23. Since the latter is operating under a pressure substantially above atmospheric, as regulated by the back pressure valve 34, the cracked vapors from still S, if returned to the system, may be forced into fractionating column 23 against the pressure existing therein, by a suitable pump or compressor 50 placed on line 49.

I claim:

1. The method of refining petroleum oils that includes, heating and partially vaporizing the oil, separating the vapors from the residual oil, fractionating the vapors to produce a vapor fraction and a liquid fraction, subjecting a stream of said liquid fraction to cracking and combining the cracked vapors with the first mentioned vapors in a vapor mixing zone, then passing the combined vapors through adsorptive clay and fractionating them to produce gasoline, and a residuum of heavier fractions, heating and vaporizing the last mentioned residuum by passing it through a heating zone in a stream separate from the first mentioned stream, and finally combining the resulting vapors with the first mentioned combined vapors at a point beyond said vapor mixing zone in the direction of vapor flow.

2. The method of refining petroleum oils that includes, heating and partially vaporizing the oil at a temperature between substantially 500 to 700° F. by passing the oil in heat transferring relation with hot combustion gases, separating the vapors from the residual oil in a separating zone, fractionating the vapors in a first fractionating zone to produce a vapor fraction and a liquid fraction, subjecting a stream of said liquid fraction to cracking in a heating zone and combining the cracked vapors with the first mentioned vapors by discharging the cracked vapors from said heating zone directly into said separating zone, then passing the combined vapors through a second fractionating zone to produce gasoline and a residuum of heavier fractions, heating and vaporizing the last mentioned residuum and then superheating and cracking the vapors by passing them through a heating zone in a stream separate from the first mentioned stream, and finally combining the resulting cracked vapors with the first mentioned combined vapors by introducing said resulting cracked vapors directly into said first fractionating zone.

3. The method of refining petroleum oils that includes, heating and partially vaporizing the oil at a temperature between substantially 500 to 700° F. by passing the oil in heat transferring relation with hot combustion gases, separating the vapors from the residual oil in a separating zone, passing the vapors through a first fractionating zone to produce a vapor fraction and a liquid fraction, cracking a stream of said liquid fraction by passing said stream through a heating zone and combining the cracked vapors with the first mentioned vapors by discharging the cracked vapors from said heating zone directly into said separating zone, then passing the combined vapors through a second fractionating zone to produce gasoline and a residuum of heavier fractions, heating and cracking the last mentioned residuum by passing it through a heating zone in a stream separate from the first mentioned streams, and finally discharging the resulting vapors from the last mentioned heating zone directly into said first fractionating zone, and combining the resulting residuum from said last mentioned cracking step with said stream of liquid fraction being subjected to cracking.

4. The method of refining petroleum oils that includes heating and partially vaporizing the oil at a temperature between substantially 500 to 700° F. by passing the oil in heat transferring relation with hot combustion gases, separating the vapors from the residual oil in a separating zone, fractionating the vapors in a first fractionating zone to produce a vapor fraction and a liquid fraction, subjecting a stream of said liquid fraction to cracking in a heating zone and combining the cracked vapors with the first mentioned vapors by discharging the cracked vapors from said heating zone directly into said separating zone, then passing the combined vapors through a second fractionating zone to produce gasoline and a residuum of heavier fractions, heating and vaporizing the last mentioned residuum and passing at least a portion of the resulting vapors through adsorptive clay at a temperature between 800° F. and 1200° F., and finally introducing the vapors leaving said clay, into said second fractionating zone.

WILLIAM T. HANCOCK.